Dec. 16, 1924.

J. R. WILSON 1,519,284

MOTOR CONTROL SYSTEM

Filed Dec. 31, 1921      2 Sheets-Sheet 1

WITNESSES:

INVENTOR
James R. Wilson.
BY
ATTORNEY

Dec. 16, 1924.

J. R. WILSON

MOTOR CONTROL SYSTEM

Filed Dec. 31, 1921   2 Sheets-Sheet 2

WITNESSES:

INVENTOR
James R. Wilson.
BY
ATTORNEY

Patented Dec. 16, 1924.

1,519,284

UNITED STATES PATENT OFFICE.

JAMES R. WILSON, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed December 31, 1921. Serial No. 526,157.

*To all whom it may concern:*

Be it known that I, JAMES R. WILSON, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to motor-control systems employing a phase-converter to translate single-phase energy into three-phase energy.

The object of my invention is to provide an improved method of starting a phase-converter that is employed to translate one form of electrical energy into another form.

Heretofore, such apparatus as has been constructed for starting a phase-converter has proved somewhat unsatisfactory by reason of a heavy surge of current traversing the primary winding of the phase-converter when the primary winding is first connected across substantially the entire secondary winding of the main supply transformer.

Briefly speaking, my invention consists in employing the groups of switches that govern the phase-balancing functions of the primary and tertiary windings of a phase-converter to also effect a gradual increase in the energization of the phase-converter.

For a better understanding of my invention, reference may be made to the accompanying drawings, Figure 1 of which is a schematic view of the main circuits of a motor-control system employing a phase-converter and organized in accordance with my invention;

Figures 1, 4:
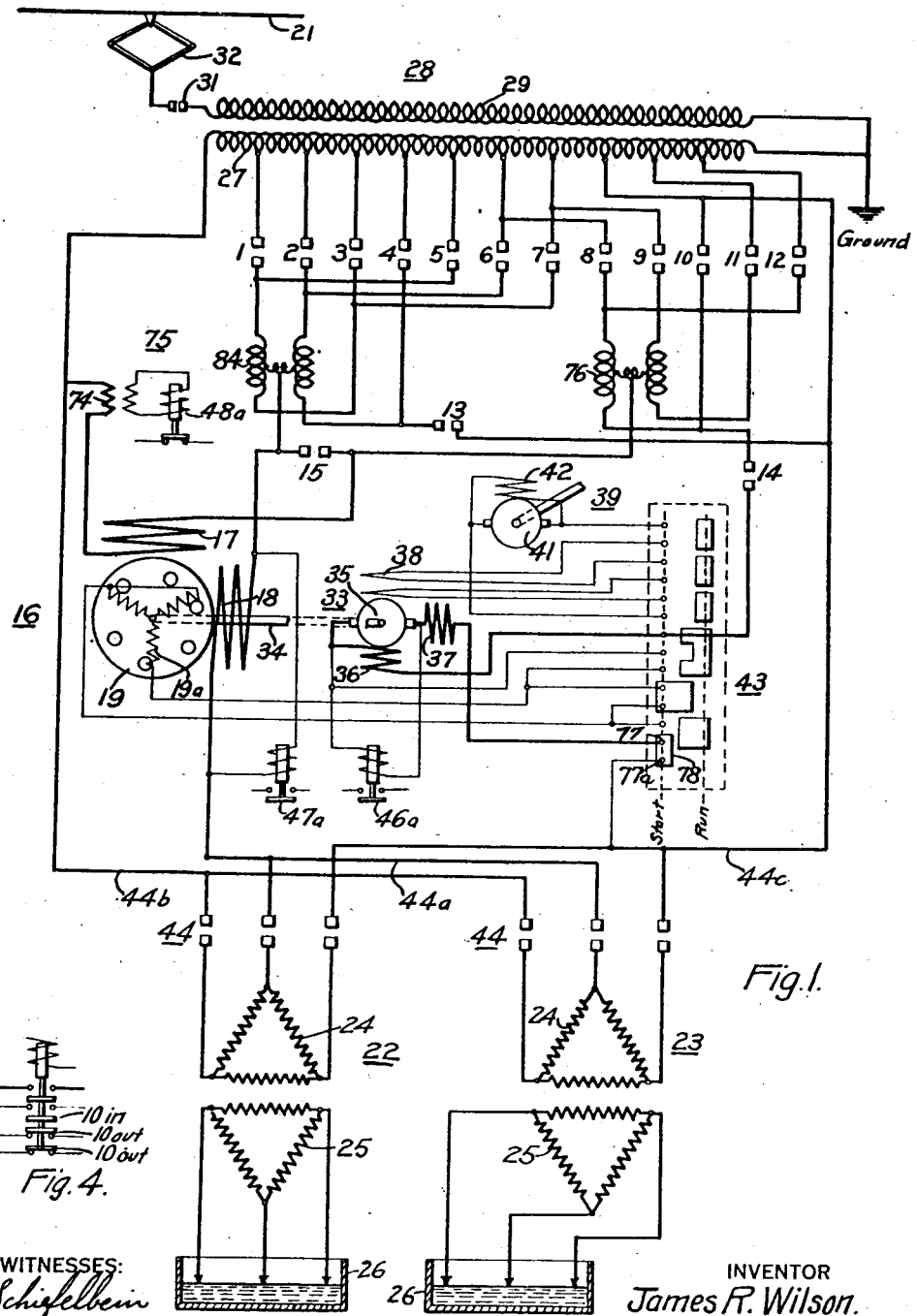
Fig. 4 is a diagrammatic view of one of the switches illustrated in Fig. 1 of the drawings.

Referring particularly to Fig. 1 of the drawings, a plurality of switches 1 to 15, inclusive, are employed to govern the energization of a phase-converter 16, having a primary winding 17, a tertiary winding 18 and a squirrel-cage rotor 19 also having a direct-current exciting winding 19a. The phase-converter 16 is employed to translate single-phase energy, supplied from a trolley conductor 21 and return circuit marked "Ground", to three-phase energy for operating a plurality of induction motors 22 and 23. The motors 22 and 23 are each provided with a primary winding 24 and a secondary winding 25. A plurality of liquid rheostats 26, which may be constructed in accordance with any usual practice, are employed for governing the resistance in circuit with the secondary winding 25 of each of the motors 22 and 23.

The switches 1 to 15, inclusive, are connected to a plurality of taps of a secondary winding 27 of a main supply transformer 28. The main transformer 28 is provided with a primary winding 29, which is energized, upon the closure of a circuit-breaker 31, through a circuit that is established from the trolley conductor 21 through pantograph 32, circuit-breaker 31 and primary winding 29 of main transformer 28 to "ground." An auxiliary dynamo-electric machine or motor 33, mechanically connected to the phase-converter 16 by means of a shaft 34, is employed initially to act as a motor to start the phase-converter 16 and to function as a generator to energize the rotor winding 19a.

The auxiliary motor 33 is provided with an armature 35, a main series field-magnet winding 36, an auxiliary or commutating field-magnet winding 37 and a divided field-magnet winding 38. The divided field-magnet winding 38 of the auxiliary motor 33 may be energized by a motor-generator set 39, comprising an armature 41 and a field-magnet winding 42.

A changeover switch 43, having a "start" and a "run" position, is employed for connecting the armature 41 of the motor-generator set 39 to the divided field-magnet winding 38 of the auxiliary motor 33 and for connecting the armature 35 of the auxiliary motor 33 to the rotor winding 19a of the phase-converter 16, upon the phase-converter 16 attaining substantially synchronous speed.

The primary winding 24 of each of the main driving motors 22 and 23 may be connected to the secondary winding 27 of the transformer 28 and the tertiary winding 18 of the phase-converter 16 by means of a plurality of circuit-breakers or line switches 44 and a plurality of conductors 44a, 44b, and 44c in accordance with standard practice.

The operation of the switches 1 to 15, inclusive, is governed, during the starting of the phase-converter 16, by a sequence drum 45 (see Fig. 3), a starting motor relay 46a, a phase-converter relay 47a, and a current relay 48a, in a manner hereinafter more fully described.

The sequence drum 45 is provided with an "off" position and a plurality of operating positions a to i inclusive. The sequence drum 45 may be actuated by means of a "PK" engine 46, comprising a shaft 47, which is secured to the rotatable drum 45, a pinion 48, which is secured to the end of the shaft 47 and actuated by a rack member 49, and a pair of pistons 51 and 52, which are mounted at opposite ends of the rack member 49 and travel within the cylinders 53 and 54, respectively.

Movement of the rotatable shaft 47 to bring the drum 45 into the illustrated "off" position is effected by applying air pressure to the piston 52, which is governed by an electromagnetic valve device 55. The sequence drum 45 is actuated through its operating positions when pressure is applied to the piston 51 and concurrently released from the piston 52. Air is supplied to the cylinder 53 through an electromagnetic valve device or "on" valve 56, which comprises a valve stem 57, having outlet and inlet valve members 58 and 59, respectively, mounted thereon.

The valve stem 57 is actuated by an armature member 61, upon the energization of a coil 62, to effect the closure of the outlet valve 58 and the opening of the normally closed inlet valve 59 to apply pressure to the piston 51. When the coil 62 is de-energized, a resilient member 63 actuates the valve stem 57 to effect the closure of the inlet port 59 and the opening of the outlet port 58.

The electromagnetic valve device or "off" valve 55 comprises a normally open inlet valve 65 and a normally closed outlet valve 66, which are mounted upon a valve stem 67. An armature member 68 is secured to one end of the valve stem 67 and serves to actuate it to effect closure of the inlet valve 65 and the opening of the outlet valve 66 upon the energization of an actuating coil 69. A resilient member 70 maintains the inlet valve 65 normally opened and the outlet valve 66 normally closed.

When the coils 62 and 69 are concurrently de-energized, the "PK" engine 46 returns the drum 45 to its "off" position. When both coils are concurrently energized, the "PK" engine 46 actuates the drum 45 to one of its operating positions. When the coil 62 is energized, and the coil 69 is de-energized, air pressure is simultaneously applied to both the pistons 51 and 52 to maintain the rack member 49 in whatever position it may, at the time, occupy.

Referring to Fig. 4 of the drawings, the switch 10 is provided with an actuating coil for actuating the main contact member 10 from its open to its closed position, to open a plurality of auxiliary contact members or interlocks 10-out and to close a plurality of auxiliary contact members or interlocks 10-in, all of tht auxiliary contact members being mechanically connected to the main contact member 10. The auxiliary contact devices of the switch 10 will be referred to as interlocks, the operation thereof being well understood by those skilled in the art.

The remaining switches 1 to 9 and 11 to 13, inclusive, are constructed in substantially the same manner as switch 10, with the exception of the interlocks. Switches 14 and 15 are also provided with interlocks, which are arranged in accordance with the requirements of the portion of the control system in which they are employed.

Figures 2, 3:
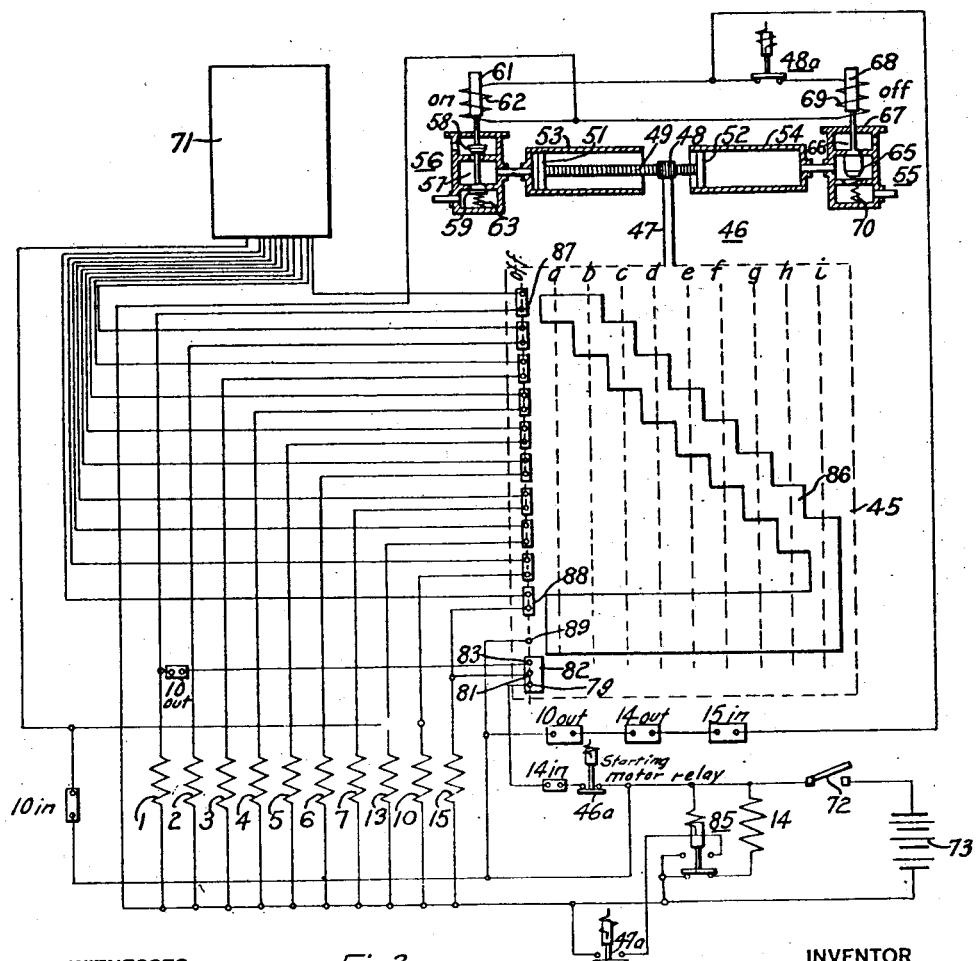
Fig. 2 is a sequence chart showing the order of closure of a plurality of switches illustrated in Fig. 1 of the drawings.
Fig. 3 is a diagrammatic view of the auxiliary circuits that are employed to govern the switches which are illustrated in Fig. 1 of the drawings.

The actuating coils of the switches 1 to 7, inclusive, 10, and 13 to 15, inclusive, are illustrated in Fig. 3 of the drawings. After switch 10 has assumed its closed position, these coils may be energized through a controller 71 to operate the corresponding switches, thereby varying the energization of the primary winding 17 and tertiary winding 18 of the phase-converter 16 to effect phase-balancing of the three-phase primary winding 24 of each of the motors 22 and 23.

The purpose and method of securing phase-balancing are well understood to those skilled in the art of railway-motor-control systems and is fully described in a number of patents, for instance, No. 1,243,430, to B. G. Lamme, dated Oct. 16, 1917, and assigned to the Westinghouse Electric and Manufacturing Company.

Briefly speaking, phase-balancing is effected by shifting one of the terminals of the primary winding 17 of the phase-converter 16 across the secondary winding 27 of the main transformer 28 by means of the switches 8 to 12, inclusive, and by shifting the connection of the tertiary winding 18 of the phase-converter 16 along the central portion of the secondary winding 27 of the main transformer 28, by means of the switches 1 to 7, inclusive, to balance the two phases that may be represented by the pairs of conductors 44a and 44b and 44a and 44c with the third phase represented by conductors 44b and 44c.

Heretofore, in starting a phase-converter, the primary winding 17 of the phase-converter 16 has been first connected, by means of a switch, to a tap corresponding to switch 1 and, after the phase-converter 16 has attained substantially synchronous speed, the terminal of the primary winding 17 of the phase-converter 16 was disconnected from this tap and connected to a tap corresponding to switch 10. This sudden change in the connection of the primary winding 17 caused a heavy surge of current through it and was very undesirable because of the shock to the phase-converter 16 and the control system in which the phase-converter was employed, upon the occurrence of this transition. The shocks to the phase-converter have been so great as to cause appreciable vibration of the locomotive upon which the phase-converter was mounted.

By means of switch 15, the primary winding 17 of the phase-converter 16 is connected to the group of switches 1 to 7, inclusive, and 13, thereby permitting a gradual step-by-step variation in voltage of the primary winding 17 by the closure of the switches 1 to 7, inclusive, during the period that the phase-converter 16 is brought to synchronous speed and voltage is being built up in it. During the starting of the phase-converter 16, the operation of the switches 1 to 7, inclusive, 10, 13 and 15 is governed by the sequence drum 45.

When contactor 10 is closed, the coils 62 and 69 of the "PK" engine 46 are de-energized and the sequence drum is returned to its "off" position, thereby connecting the switches 1 to 7, inclusive, 13 and 15 to controller 71 through interlocks which are mounted upon the drum 45. The controller 71 is employed to govern these switches to effect phase-balancing, as has been previously described.

The full operation of the control system, as illustrated, is as follows: A hand switch 72 (see Fig. 3 of the drawings) is first closed to effect energization of the actuating coil of the switch 14 by a battery 73 or other suitable source of electrical energy. Upon the energization of the actuating coil of the switch 14, the switch assumes its closed position, thereby establishing a circuit from the end tap of the secondary winding 27 of the main transformer 28 through the primary winding 74 of a current transformer 75, which governs the energization of the current relay 48, primary winding 17 of the phase-converter 16, a portion of preventive coil 76, switch 14, series field-magnet winding 36, armature 35 and auxiliary field-magnet winding 37 of the auxiliary motor 33, and control fingers 77 and 77a, which are bridged by contact segment 78 of the changeover switch 43, to the tap of the secondary winding 27 of the main transformer 28, to which the switch 10 is connected. When the auxiliary motor 33 attains a predetermined speed, the starting motor relay 46a, which is governed by the counter-electromotive force of the auxiliary motor 33, assumes its closed position.

When the starting motor relay 46a is closed, the actuating coil of the switch 15 is energized by a circuit from the battery 73 through a manually-operated switch 72, contact member of the starting motor relay 46a, interlock 14-in, control fingers 79 and 81, which are bridged by contact segment 82 of the sequence drum 45 and actuating coil of the switch 15 to the negative terminal of the battery 73. The actuating coil of the switch 1 is connected in parallel relation to the switch 15 through control fingers 79 and 83, which are bridged by contact segment 82 of the sequence drum 45 and interlock 10-out.

Upon the closure of the switches 1 and 15, a circuit is established from the end tap of the secondary winding 27 of the main transformer 28 through the primary winding 74 of the current transformer 75, primary winding 17 of the phase-converter 16, switch 15, a portion of preventive coil 84, and switch 1 to the secondary winding 27 of the main transformer 28. The energization of the primary winding 17 of the phase-converter 16, which is effected by the closure of switches 1 and 15, tends to prevent overspeeding of the phase-converter 16 by the starting motor 33.

When the phase-converter 16 attains substantially synchronous speed, the phase-converter relay 47a closes, thereby effecting the energization of the auxiliary phase-converter relay 85. The energization of the actuating coil of the auxiliary phase-converter relay 85 effects the opening of relay 85 and switch 14. The relay 85 is maintained in its open position by means of a holding circuit from the battery 73 through manually-operated switch 72, actuating coil of the auxiliary phase-converter relay 85 and the contact members thereof to the negative terminal of the battery 73. The switch 14 will remain in its open position until the manually-operated switch 72 has been actuated to its open position and again closed.

The purpose of the relay 85 is to prevent improper starting of the phase-converter 16, once the phase-converter has been rendered inoperative by reason of its being disconnected for too long an interval from the trolley conductor 21, or for any other reason.

When the switch 14 assumes its open position, the auxiliary or starting motor 33 is disconnected from the primary winding 17 of the phase-converter 16, and the starting motor 33 no longer serves to drive the rotor of the phase-converter 19. Upon the opening of the switch 14, a circuit is established from the battery 73, through manually-operable switch 72, interlocks 10-out, 14-out and 15-in, and parallel-connected actuating coils 62 and 69 of the "PK" engine 46 to the negative terminal of the battery 73.

When the coils 62 and 69 of the "PK" engine 46 are energized, the sequence drum 45 will be actuated from its "off" position to position a, thereby establishing a circuit from the positive terminal of the battery 73 through manually-operable switch 72, control fingers 89, 88 and 87, which are bridged by contact segment 86, and parallel-connected actuating coils of the switches 1 and 15 to the negative terminal of the battery 73.

When the drum 45 is actuated from its "off" position, segment 82 will no longer engage the control fingers 79, 81 and 83 of the sequence drum 45, and the energization of the switches 1 and 15 will be rendered independent of the starting-motor relay 46a. Switches 2 to 7, inclusive, 13 and 10 will be closed in the predetermined sequence upon the sequence drum 45 occupying positions b to i, inclusive.

If, upon the closure of any one of the switches 2 to 7, inclusive, or 13, the current traversing the primary winding 17 of the phase-converter 16 exceeds a predetermined value, the actuating coil of the current-limit relay 48a will be energized sufficiently to effect the opening of the relay 48a. When the current-limit relay 48a assumes its open position, the actuating coil 49 of the "off" valve 55 of the "PK" engine 46 will be de-energized, thus bringing the sequence drum 45 to rest, as previously explained.

When the current traversing the primary winding 17 of the phase-converter 16 falls below this predetermined value, the relay device 48a will assume its closed position, thereby re-energizing the coil 69 of the "off" valve 55 and thus permitting further actuation of the drum 45 by the piston 51.

Closure of the switches 2 to 7, inclusive, and 13, as illustrated by Fig. 2 of the sequence chart, effects a gradual increase in the energization of the primary winding 17 of the phase-converter 16.

When the switch 10 is closed, upon the energization of its actuating coil through the contact segment 86 of the sequence drum 45, in position i thereof, both coils 62 and 69 of the "on" and "off" valves 56 and 55, respectively, of the "PK" engine are de-energized by the interlock 10-out. The "PK" engine 46 will then return the sequence drum 45 to its "off" position. The switch 10 is maintained in its closed position by a holding circuit from the positive terminal of the battery 73 through manually-operable switch 72, interlock 10-in and the actuating coil of the switch 10 to the negative terminal of the battery 73.

When the sequence drum 45 occupies its "off" position, control of the switches 1 to 15, inclusive, with the exception of switches 10 and 14, may be governed by the controller 71. The energization of the actuating coils of these switches is governed by an interlock 10-in. If the switch 10 should assume its open position, the controller 71 would be de-energized. An interlock 10-out, which is connected in series relation with the actuating coil of the switch 1, prevents the actuating coils of the switches 1 and 15 from being connected in parallel relation through contact segment 82 of sequence drum 45, when the sequence drum 45 occupies its "off" position.

After the closure of the switch 10, the changeover switch 43 is automatically actuated from its starting position to its running position. The movement of the changeover switch 43 may be governed by suitable interlocking with the switch 10, which it has not been considered necessary to illustrate.

From the above description, it is apparent that apparatus constructed in accordance with my invention will effect a gradual energization of the primary winding 17 of the phase-converter 16, without the addition of any main switches, only the switch 15 being re-positioned, and that the operation of these switches is governed by a sequence drum and a current-limit relay, which are the only additional apparatus required.

While I have shown my invention in its preferred form, it is apparent that modifications may be made in the apparatus and arrangement of circuits without departing from the spirit of my invention. I desire, therefore, to be limited only by the scope of the appended claims.

I claim as my invention:—

1. In a motor-control system, the combination with a transformer and a phase-converter having a primary and a secondary winding, of means comprising a plurality of switches for connecting said primary and secondary windings to said transformer, and means comprising said switches and a current-limit relay for gradually and automatically increasing the voltage impressed upon said primary winding during the starting period of said phase-converter.

2. In a motor-control system, the combination with a transformer and a phase-converter having a primary and a secondary winding, of means comprising a plurality of switches for connecting said primary and secondary windings to said transformer, and means comprising a sequence drum and a current-limit relay, for effecting the operation of said switches to gradually energize said primary winding during the starting period of said phase-converter.

3. In a motor-control system, the combination with a transformer and a phase-converter having a primary and a secondary winding, of means comprising a plurality of switches for gradually energizing said primary winding during the starting period of said phase-converter, means comprising said switches for varying the connections of said primary and secondary windings to effect phase-balancing, and means for rendering said second means operative only after said first means has operated.

4. In a motor-control system, the combination with a transformer and a phase-converter having a primary and a secondary winding, of a plurality of switches for connecting said primary and said secondary windings to said transformer, means comprising a motor for starting said phase-converter, means for closing said switches in a predetermined sequence to gradually energize said primary winding during the starting of said phase-converter, means for rendering said closing means inoperative, and means for governing said switches to maintain the currents traversing said primary and secondary windings in predetermined relation.

5. In a motor-control system, the combination with a transformer having a plurality of taps, and a phase-converter having a primary and a secondary winding, of means comprising a plurality of switches for connecting said primary and secondary winding to said taps, a switch for directly connecting said primary and said secondary winding, a motor for starting said phase-converter, a switch for energizing said motor, a sequence drum for governing said switches to effect gradual energization of said primary winding, means for controlling said sequence drum, and means for governing said switches independently of said controlling means to effect phase-balancing of the outgoing phases of said phase-converter.

6. In a motor-control system, the combination with a transformer and a phase-converter having a primary and a secondary winding, of means for effecting phase-balancing of the outgoing phases of said windings, means for gradually energizing said windings during the starting of said phase-converter, and means for rendering said phase-balancing means inoperative until after said phase-converter has been brought to a predetermined speed.

7. In a motor-control system, the combination with a transformer and a phase-converter having a primary and a secondary winding, of means comprising a plurality of groups of switches for connecting said windings to said transformer, a switch for connecting said groups of switches together only during the starting of said phase-converter, and means for governing said switches during the starting of said phase-converter and during its normal operation.

8. In a motor-control system, the combination with a transformer and a phase-converter having a primary and a secondary winding, of means comprising a group of switches for connecting said primary winding to one portion of said transformer, means comprising another group of switches for connecting said secondary winding to said transformer and means for interconnecting said groups of switches during the starting of said phase-converter for gradually energizing the primary winding of said phase-converter.

9. In a motor-control system, the combination with a transformer and a phase-converter having a primary and a secondary winding, of means comprising a group of switches for connecting said primary winding of one portion of said transformer, means comprising a second group of switches for connecting said secondary winding to said transformer, a switch for connecting said second group of switches to said primary winding during the starting of said phase-converter, means comprising a sequence drum for governing the operation of said switches during the starting of said phase-converter, means comprising a relay device for governing the movement of said sequence drum in accordance with the energization of said phase-converter, and means for governing the operation of said switches independently of said drum, provided the drum occupies a predetermined position.

10. In a motor-control system, the combination with a transformer having a plurality of taps and a phase-converter having a primary and a secondary winding, of means comprising a group of switches for connecting said primary winding to certain of said taps, means comprising a second group of switches for connecting said secondary winding to others of said taps, a switch for connecting said second group of switches to said primary winding, a motor for starting said phase-converter, a switch for connecting said motor in series relation with said primary winding, means comprising a sequence drum having a plurality of positions and a current-limit relay for governing the closure of said switches to start said phase-converter, means for returning said drum to a predetermined position after said phase-converter has attained a predetermined speed, and means for independently governing certain of said switches upon said drum returning to a predetermined position.

11. In a motor-control system, the combination with a transformer having a plurality of taps, and a phase-converter having a primary and a secondary winding, of means comprising a plurality of switches for connecting said primary and secondary winding to said taps, a switch for directly connecting said primary and said secondary winding, a motor for starting said phase-converter, a switch for energizing said motor, a sequence drum for governing said switches to effect gradual energization of said primary winding, means responsive to the current traversing the primary winding for automatically governing said sequence drum, and means for governing said switches independently of said automatic means to effect phase-balancing of the outgoing phases of said phase-converter.

In testimony whereof, I have hereunto subscribed my name this 14th day of December 1921.

JAMES R. WILSON.